(12) United States Patent
Haung et al.

(10) Patent No.: US 7,173,762 B2
(45) Date of Patent: Feb. 6, 2007

(54) OPTICAL ISOLATOR WITH REDUCED INSERTION LOSS AND MINIMIZED POLARIZATION MODE DISPERSION

(75) Inventors: Yonglin Haung, San Jose, CA (US); Ping Xie, San Jose, CA (US); Xin Luo, Sunnyvale, CA (US); Liren Du, Sunnyvale, CA (US)

(73) Assignee: Finisar Corporation, Sunnyvale, CA (US)

( * ) Notice: Subject to any disclaimer, the term of this patent is extended or adjusted under 35 U.S.C. 154(b) by 695 days.

(21) Appl. No.: 09/900,713

(22) Filed: Jul. 5, 2001

(65) Prior Publication Data

US 2002/0060843 A1 May 23, 2002

Related U.S. Application Data

(60) Provisional application No. 60/240,441, filed on Oct. 13, 2000.

(51) Int. Cl.
*G02B 5/30* (2006.01)
*G02B 27/28* (2006.01)
*G02F 1/09* (2006.01)

(52) U.S. Cl. .............. 359/484; 359/495; 359/496; 359/497; 359/281; 359/900; 372/703; 385/11; 385/36

(58) Field of Classification Search ........... 359/484, 359/494, 495, 496, 497, 281, 282, 900; 372/703; 385/11, 36
See application file for complete search history.

(56) References Cited

U.S. PATENT DOCUMENTS

| | | | | |
|---|---|---|---|---|
| 4,178,073 A | * | 12/1979 | Uchida et al. | 359/484 |
| 4,239,329 A | * | 12/1980 | Matsumoto | |
| 5,251,058 A | * | 10/1993 | MacArthur | |
| 5,262,892 A | * | 11/1993 | Nakamura | 359/495 |
| 5,278,853 A | * | 1/1994 | Shirai et al. | 372/703 |
| 5,315,431 A | * | 5/1994 | Masuda et al. | 359/281 |
| 5,446,578 A | * | 8/1995 | Chang et al. | 359/282 |
| 5,557,692 A | * | 9/1996 | Pan et al. | 359/494 |
| 5,602,673 A | * | 2/1997 | Swan | 359/496 |
| 5,631,771 A | * | 5/1997 | Swan | 359/497 |
| 5,734,762 A | * | 3/1998 | Ho et al. | |
| 5,774,264 A | * | 6/1998 | Konno et al. | 359/484 |
| 5,930,038 A | * | 7/1999 | Swan | 359/484 |
| 6,421,176 B1 | * | 7/2002 | Takahashi et al. | 359/484 |
| 6,553,156 B1 | * | 4/2003 | Li | 385/11 |

FOREIGN PATENT DOCUMENTS

| | | | | |
|---|---|---|---|---|
| JP | 54-159245 | * | 12/1979 | 359/484 |
| JP | 0131517 | * | 5/1989 | 359/484 |
| WO | 405188323 | * | 7/1993 | 359/484 |

* cited by examiner

*Primary Examiner*—Ricky D. Shafer
(74) *Attorney, Agent, or Firm*—Workman Nydegger

(57) ABSTRACT

An isolator is disclosed that features a single birefringent correction element. The correction element is configured to eliminate differential group delay and walk-off simultaneously.

34 Claims, 6 Drawing Sheets

OPTICAL ISOLATOR WITH REDUCED INSERTION LOSS AND MINIMIZED POLARIZATION MODE DISPERSION

RELATED APPLICATIONS

This application claims the benefit of U.S. Provisional Application No. 60/240,441, filed Oct. 13, 2000.

BACKGROUND

1. Field

The present disclosure relates generally to fiber optics, and in particular, to optical isolators.

2. The Prior Art

3. Background

The optical isolator is an element of modern optical communication networks. Optical isolators allow light to travel in one direction, while blocking light traveling in an opposite direction. The ever-increasing speeds of today's optical networks have placed higher performance demands on optical isolators. Today, network speeds of 40 Gb/s and higher are required for many applications. Polarization Mode Dispersion (PMD), Polarization Dependent Loss (PDL), and insertion loss are important characteristics which must be minimized in any high-speed optical communication system.

FIG. 1 shows a prior art optical isolator as described in U.S. Pat. No. 4,548,478 and assigned to Fujitsu Limited of Kawasaki of Japan. The optical isolator 100 of FIG. 1 includes an optical fiber 102 from which an incident light beam 104 is launched into a first lens 106. Two birefringent plates 108 and 112 are placed on either side of a 45° Faraday rotator 110 within the path of the light beam 104. When light passes through the birefringent plate 108 in a forward direction (left to right), the angle of refraction of an ordinary-ray (o-ray) 114 and an extraordinary-ray (e-ray) 116 are different, so that a polarization separation is realized, the o-and e-rays are then directed into the Faraday rotator 110, where their planes of polarization are rotated 45°, The o- and e-rays are then directed into birefringent plate 112, which is configured to transmit the e- and o-rays in a parallel manner. These parallel beams are then focused into optical fiber 120 by second lens 118. However, light traveling in a reverse direction (from right to left) will have its e-and o-rays refracted in a different manner by the birefringent plates, causing the rays not to be focused into optical fiber 102 by lens 104.

While the optical isolator 100 of FIG. 1 performs its intended function, certain disadvantages have become evident. For example, the displacement of the e- and o-rays in space (known as walk-off) introduces insertion loss and Polarization Dependent Loss (PDL) into the isolator in the forward path. Additionally, the fact that the two beams are traveling different optical paths results in the two beams having different velocities when passing through the isolator. This results in the device not being PMD-free that may not be acceptable for modern optical communication systems.

BRIEF DESCRIPTION

A portion of an optical isolator herein referred to as an optical isolator core is disclosed which may include: a first polarizer configured to receive incident light traveling along a path and refract said incident light into o-rays and e-rays. A rotator is disposed along the path and configured to rotate the polarization planes of the o-rays and e-rays. A second polarizer is disposed along the path and has an optic axis 45° apart from, and a wedge cutting direction aligned as in, the first polarizer.

A correction element of birefringent material having a length and an optical plane within the optic axis of the second polarizer is provided. The correction element has an optical axis angle and length that are chosen to compensate for PMD and walk-off introduced by the first and second polarizers.

An additional aspect of the disclosed optical isolator core is provided which includes a first polarizer configured to separate light incident in the forward direction into at least one o-ray and at least one e-ray; a polarization rotator; a second polarizer; and a correction element having a crystal optic axis which lies in a plane defined by the at least one e-ray and said at least one o-ray.

A further aspect of the disclosed optical isolator core is provided in which the at least one o-ray and at least one e-ray travel through the isolator separated by a predetermined walk-off distance. The correction element is configured to substantially reduce the walk-off distance between the at least one o-ray and said e-ray exiting the second polarizer. Additionally, the correction element is configured to substantially eliminate the first order polarization mode dispersion, namely DGD (Differential Group Delay).

Further aspects of the disclosed optical isolator core include the o-ray and one e-ray intersecting at an angle β within the correction element. The correction element has a physical length of L. The disclosed optical isolator may be configured so the o-ray and e-ray exit the second polarizer separated by a walk-off distance that is approximately equal to the length L multiplied by the tangent of angle β.

The correction element of the disclosed optical isolator may have a tangent of angle β defined as:

$$\tan(\beta) = \frac{(n_e^2 - n_o^2)\sin(\alpha)\cos(\alpha)}{n_o^2\sin^2\alpha + n_e^2\cos^2\alpha}$$

A method for receiving light passing through an optical isolator in a forward direction through the disclosed isolator is disclosed. The method may comprise separating the light traveling in a forward direction into at least one o-ray and said at least one e-ray; rotating the polarization of the o-ray and one e-ray; refracting the o-ray and the e-ray such that they are in substantially parallel paths; and passing the o-ray and the e-ray through a correction element having an optic axis in a plane defined by the substantially parallel o-ray and e-ray exiting the second polarizer.

BRIEF DESCRIPTION OF THE DRAWING FIGURES

DETAILED DESCRIPTION

Persons of ordinary skill in the art will realize that the following description is illustrative only and not in any way limiting. Other modifications and improvements will readily suggest themselves to such skilled persons having the benefit of this disclosure.

Figure 1:
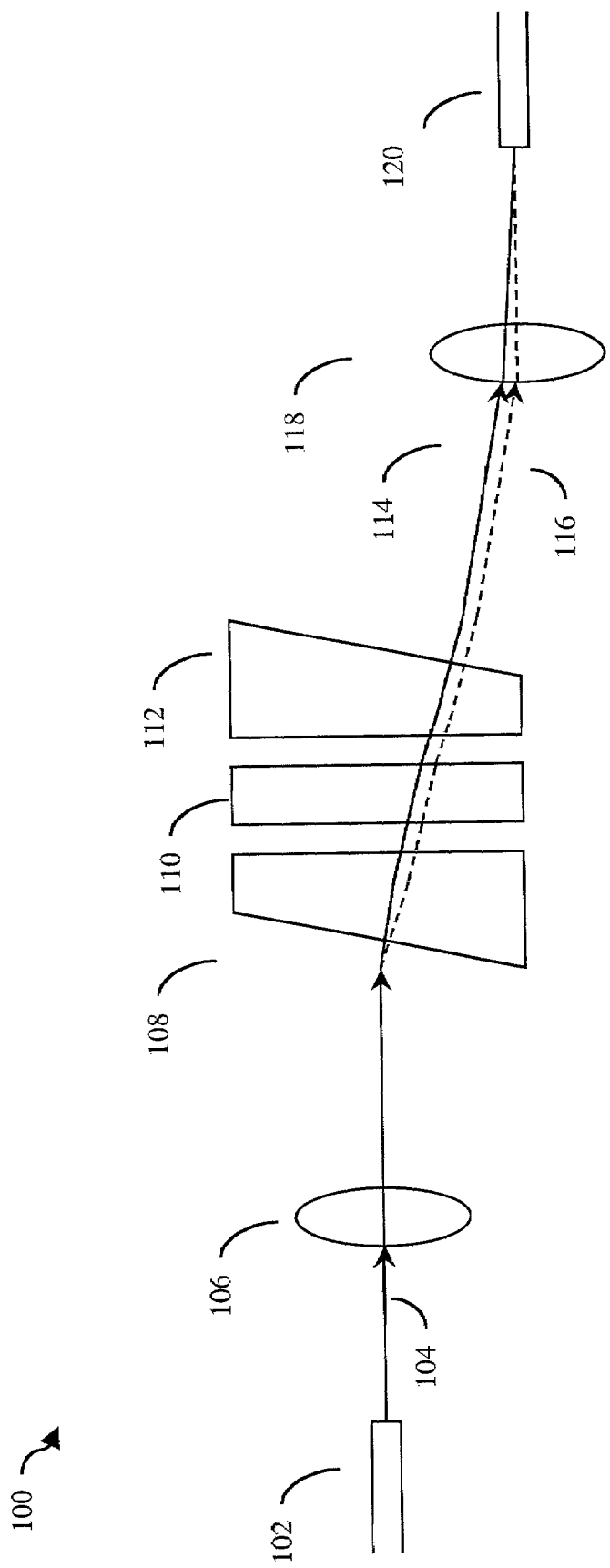
FIG. 1 is a diagram of a prior art optical isolator.
Figure 2:
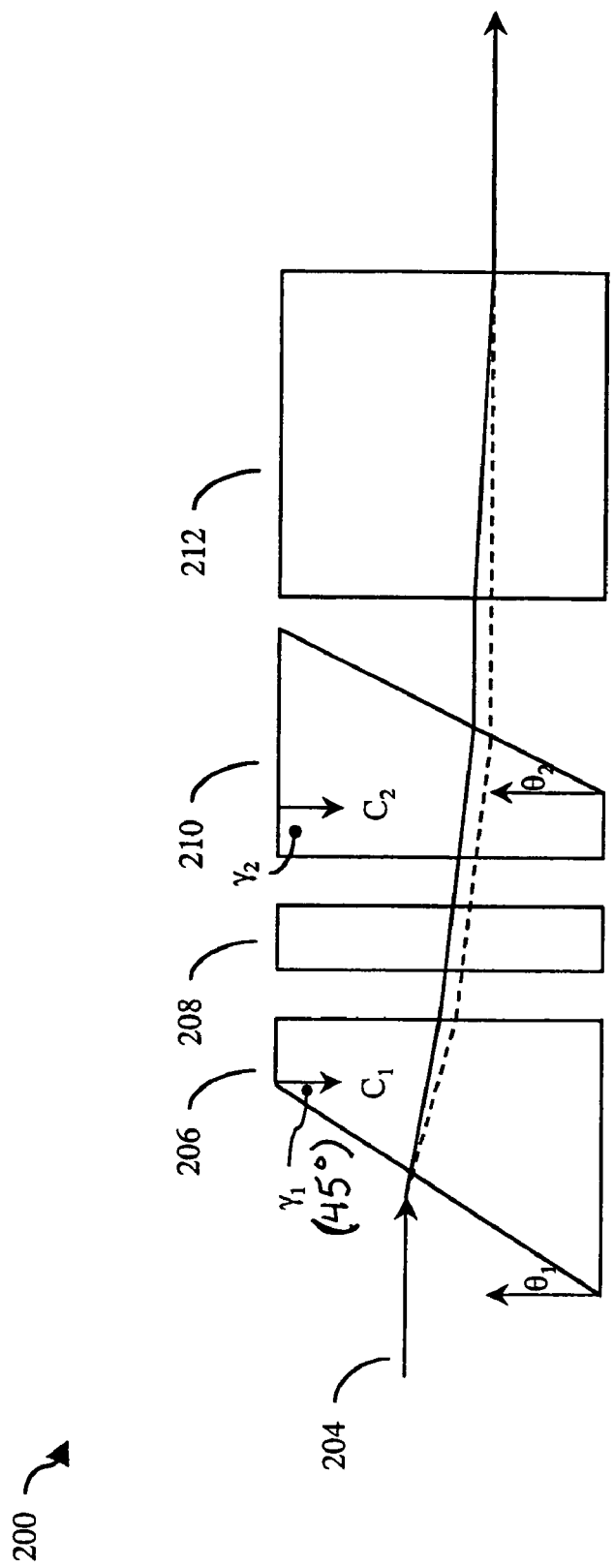
FIG. 2 is a functional diagram of the disclosed optical isolator core.

FIG. 2 is a diagram of an improved isolator core 200 which shows incident light being applied to isolator core 200 along a path 204. Isolator core 200 includes a first polarizer 206 having a wedge angle $\theta_1$. Isolator core 200 is preferably disposed within path 204. In one aspect of the disclosed isolator core, the wedge angle $\theta_1$ of polarizer 206 ranges from approximately 0° to approximately 20°. Typically, a wedge angle of approximately 8° is used for high birefringence materials such as $YVO_4$, and $TiO_2$, and approximately 13° to 15° for low birefringence materials such as $LiNbO_3$. Polarizer 206 also has an optic axis $C_1$ having an angle $\gamma_1$.

Polarizer 206 may be fabricated from birefringent materials known in the art. Preferred materials include $LiNbO_3$, $YVO4$, and $TiO_2$ such that the polarizer 206 will separate the incident light into o-rays (shown as a solid line for the condition where $n_e > n_o$) and e-rays (shown as a dashed line) as is known in the art.

Isolator core 200 also includes a rotator 208 disposed within path 204 and configured to receive the o-and e-rays from polarizer 206. Rotator 208 may comprise any non-reciprocal optical element known in the art such as a garnet Faraday rotator for rotating the planes of polarization of the incident o- and e-rays at a predetermined angle, such as approximately 45°.

Isolator core 200 further includes a second polarizer 210 disposed within path 204. Polarizer 210 also has an optic axis $C_2$ having an angle $\gamma_2$. In one aspect of a disclosed isolator core, the angle $\gamma_2$ of polarizer 210 is approximately 45° apart from the angle $\gamma_1$ of the polarizer 206.

Polarizer 210 may be fabricated from any birefringent material known in the art, such as $LiNbO_3$, $YVO_4$, and $TiO_2$. The polarizers 206 and 210 are preferably formed from the same material.

Polarizer 210 is disposed in path 204 to receive the o-and e-rays from rotator 208, and is optically configured using methods known in the art such that when the o- and e-rays exit, they are refracted and aligned in a substantially parallel manner.

The two polarizers can have optical axes C1 and C2 that 45° apart. Additionally, the difference between the two optic axes may equal approximately 45°. In another aspect of the disclosed isolator core, the angles θ1, θ2 of both polarizers 206 and 210 are substantially equal.

Figure 3:
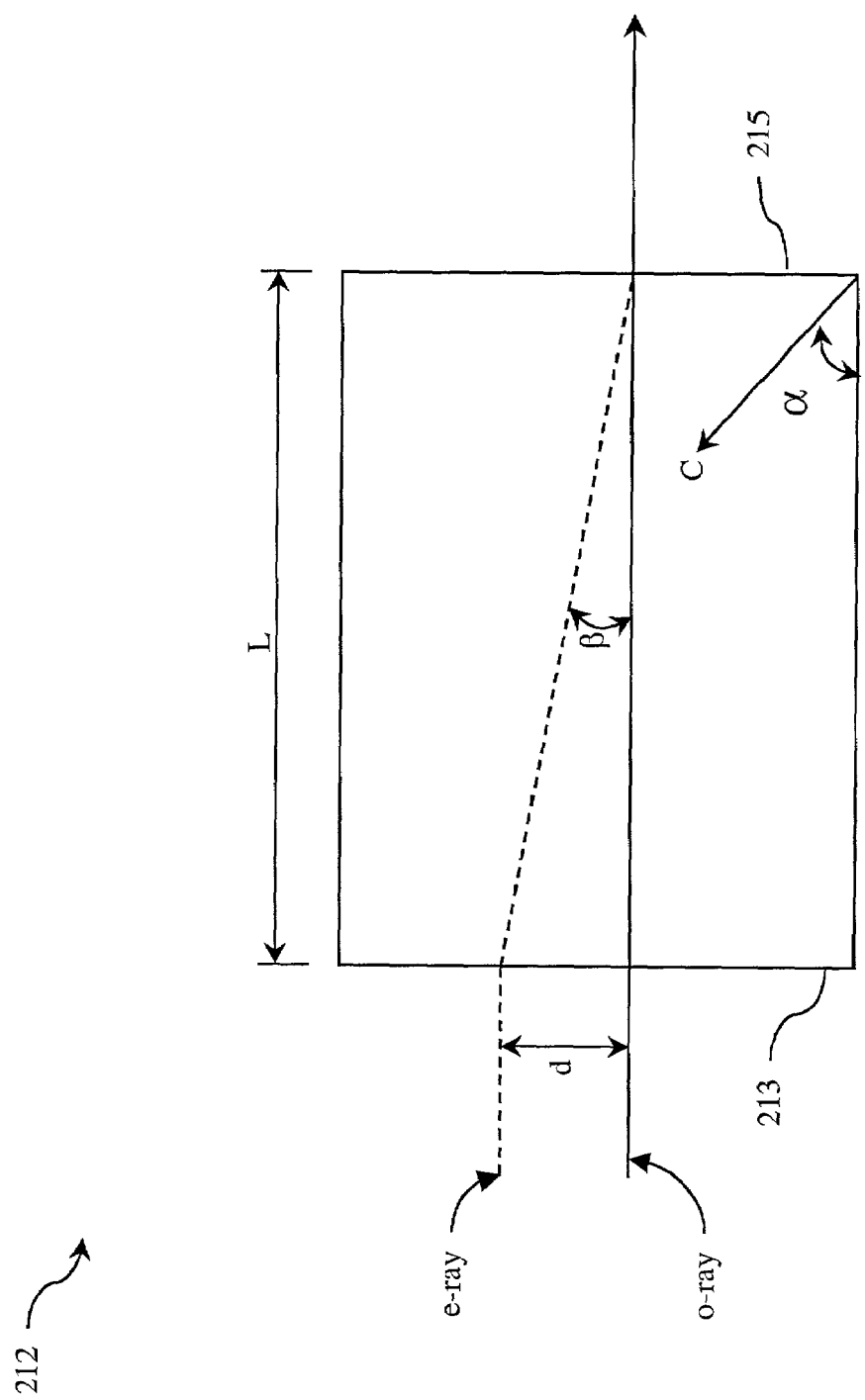
FIG. 3 is a detailed diagram of a correction element.

Isolator core 200 further includes a correction element 212, shown in more detail in FIG. 3, having a length of L, and an optic axis C having an angle α. Correction element 212 is disposed in path 204 to receive the o-and e-rays from the polarizer 210 of FIG. 2. Correction element 212 may be fabricated from birefringent materials known in the art, such as $LiNbO_3$, $YVO_4$, and $TiO_2$.

Correction element 212 may be optically configured according to the diagram of FIG. 3 and the equations below. The incident o-and e-rays are separated by a walk-off distance d when they are received by correction element 212, and are refracted such that a predetermined angle β is formed.

Additionally, referring to FIG. 3, by optimizing the optic axis angle α and the length L, both the PMD and the walk-off can be corrected at the same time while the o- and e-rays may be recombined at a distance L. As can be seen by inspection of FIG. 3, the e-ray and o-ray may be refracted by correction element 212 such that the rays intersect at a point proximate to the distal face 215 of correction element 212. It is to be understood that the correction element 212 may comprise a wide variety of shapes other than that shown in FIG. 3. In one aspect of the disclosed isolator core, the faces 213 and 215 are substantially parallel.

Figure 4:
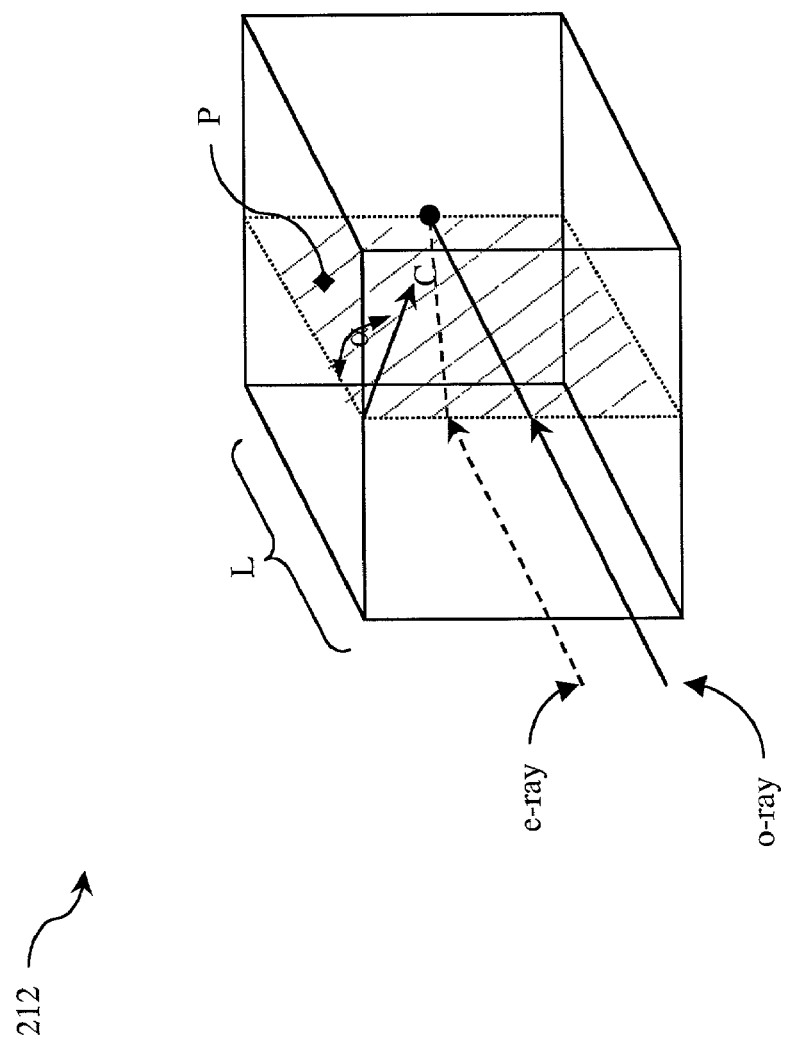
FIG. 4 is an isometric diagram of a correction element.

FIG. 4 is a three dimensional diagram of a correction element 212. FIG. 4 is provided to show how the optical plane P and the angle α of the optic axis C of correction element 212 are configured in one aspect of the disclosed isolator core. As can be seen by inspection of FIG. 4, the optical plane P of correction element 212 is preferably chosen such that it lies in a plane formed by the incident o- and e-rays. The angle α of optic axis C preferably lies within the optical plane P. The optical plane P may be aligned with or perpendicular to the optic axis of the second polarizer 210.

Correction element 212 may be configured by utilizing the following equations:

The tangent of angle β as shown in FIG. 2 may be found from:

$$\tan(\beta) = \frac{(n_e^2 - n_o^2)\sin(\alpha)\cos(\alpha)}{n_o^2\sin^2\alpha + n_e^2\cos^2(\alpha)}$$

The relationship between the walk-off distance d, length L, and the angle β can be found from:

$$d = L \cdot \tan(\beta)$$

The PMD may be found from:

$$PMD = \frac{n_e'(\alpha)L - n_o L}{c}$$

where c is the speed of light in vacuum, and where:

$$n_e'(\alpha) = \frac{n_o n_e}{\sqrt{n_o^2 \sin^2\alpha + n_e^2 \cos^2\alpha}}$$

We can solve the above equations to solve for the desired variable.

For example, L≈0.2 to 0.5 mm, and α=10° to 15°.

Figure 5:
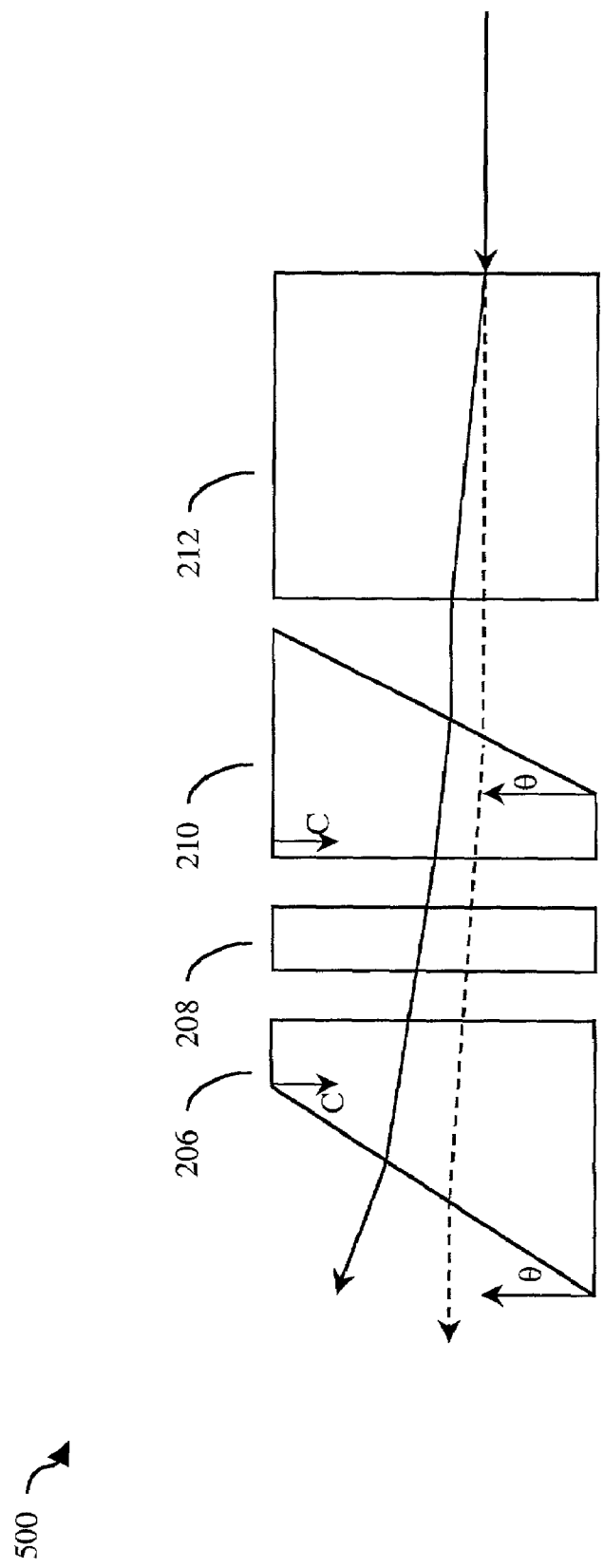
FIG. 5 is a functional diagram of the disclosed optical isolator core operating as an isolator showing light traveling in the reverse direction.

FIG. 5 is a diagram of an isolator core 500 showing the isolator core functioning as an isolator when light is incident in the reverse direction, traveling from right to left. As can be seen by inspection of FIG. 5, when light is incident from the right, the o- and e-rays will not be recombined when they exit polarizer 206.

Figure 6:
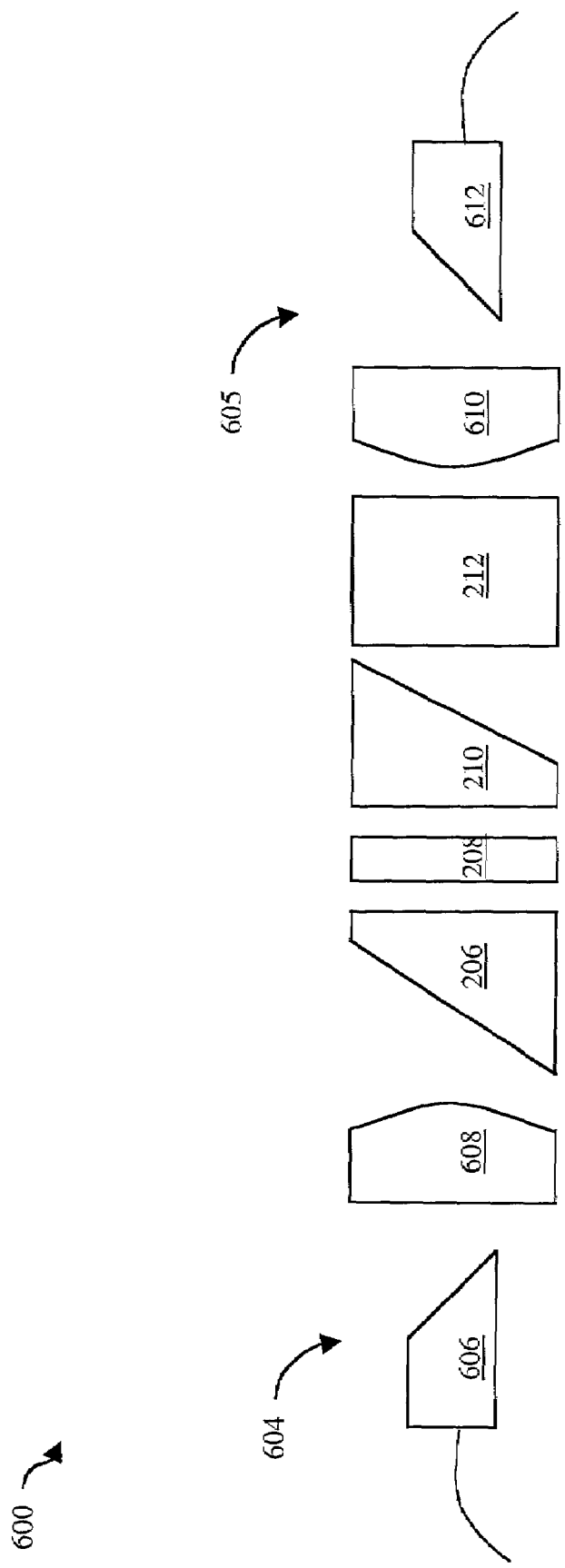
FIG. 6 is a diagram of a complete isolator unit.

FIG. 6 is a diagram of a isolator 600 including first polarizer 206, rotator 208, second polarizer 210, and correction element 212 forming an isolator core as shown and described above.

Isolator 600 may further include a first collimator 604 having a fiber pigtail 606 and a coupling lens 608, and a second collimator 605 having a fiber pigtail 612 and a coupling lens 610, all of which may be formed from materials known in the art. It is contemplated that any optical fibers known in the art may be utilized with the disclosed optical isolator.

It is further contemplated that the disclosed isolator may be fabricated in a wide variety of advantageous manners. For example, the isolator 600 may also include a magnetic ring enveloping the first polarizer 206, rotator 208, second polarizer 210, and correction element 212, further defining an isolator core. The magnetic ring may be formed from materials known in the art. Finally, the isolator 600 may be encapsulated in an outer housing and sealed as is known in the art.

The above equations and disclosed aspects result in an optical element in which the walk-off distance may be kept to a minimum, thereby minimizing polarization dependent loss. Furthermore, the correction element of the present disclosure allows for the e-and o-rays to travel optical paths that are substantially equal in length, further reducing the effects of PMD and DGD as well as reducing insertion loss.

It is contemplated that the disclosed optical isolator and isolator core may be advantageously deployed in a variety of applications where low-loss elements are needed. For example, the disclosed isolator may be used in critical long-haul applications such as optical amplifiers, where low PMD and DGD are critical. The correction element of the present disclosure may also be advantageously used in other passive optical components such as circulators and integrated polarization beam splitters and combiners.

While embodiments and applications of this disclosure have been shown and described, it would be apparent to those skilled in the art that many more modifications and improvements than mentioned above are possible without departing from the inventive concepts herein. The disclosure, therefore, is not to be restricted except in the spirit of the appended claims.

What is claimed is:

1. An optical isolator core, comprising:
   a first polarizer having a wedge shape and configured to receive incident light traveling along a path and refract the incident light into o-rays and e-rays, wherein said first polarizer has an optic axis angle of approximately +45° or −45°;
   a rotator disposed along the path and configured to rotate the polarization planes of the o-rays and e-rays;
   a second polarizer having a wedge shape and disposed along the path after the rotator, the second polarizer having an optic axis angle of approximately 0° or 90° apart from an optical axis of the first polarizer, and the first and second polarizers having approximately the same wedge angle; and
   a correction element of birefringent material, disposed along the path and adjacent to a diagonal face of the second polarizer, having a length and an optic axis angle, wherein the length and the correction element optic axis angle compensate for a differential group delay and walk-off introduced by the first and the second polarizers, wherein the correction element includes an optical plane in which said o-rays and said e-rays travel, wherein said optical plane is perpendicular to said optic axis of said second polarizer, and an input face of the correction element being parallel to an input face of the second polarizer such that the optical plane of the correction element is perpendicular to the optic axis of second polarizer.

2. The optical isolator core of claim 1, wherein a distance traveled by said o-rays and the e-rays through said correction element is equal to the length of the correction element multiplied by the tangent of angle β.

3. The optical isolator core of claim 1, wherein said correction element comprises a single piece of material.

4. The optical isolator core of claim 1, wherein said correction element is configured such that said e-rays and o-rays are refracted such that said e-rays and o-rays intersect at a point proximate to a distal face of said correction element.

5. An optical isolator adapted for receiving light transmitted through the isolator in a forward direction comprising:
   a first polarizer having a wedge shape, disposed along a path, configured to separate light incident in the forward direction into at least one o-ray and at least one e-ray;
   a polarization rotator disposed along the path;
   a second polarizer having a wedge shape and disposed along the path after the polarization rotator: and
   a correction element, disposed along the path and adjacent to a diagonal face of the second polarizer, having a length and a crystal optic axis which lies in a plane defined by the at least one e-ray and the at least one o-ray, and having a crystal optic axis angle lying in said plane defined by the at least one e-ray and at the least one o-ray, wherein said at least one o-ray and said at least one e-ray travel through said isolator separated by a walk-off distance and the length and the crystal optic axis angle of said correction element cooperate to substantially eliminate said walk-off distance between said at least one o-ray and said at least one e-ray exiting said second polarizer, the length and the crystal optic axis angle also compensateing for differential group delay introduced by the first and the second polarizers, the correction element including an optical plane in which said o-ray s and said e-rays travel, and
   wherein said optical plane is perpendicular to an optic axis of said second polarizer, and an input face of the correction element being parallel to an input face of the second polarizer such that the optical plane of the correction element is perpendicular to the optic axis of the second polarizer.

6. The optical isolator of claim 5, wherein said correction element is configured to substantially eliminate differential group delay.

7. The optical isolator of claim 5, wherein said first polarizer has a crystal optic axis of approximately +45° or −45°.

8. The optical isolator of claim 5, wherein said second polarizer has a crystal optic axis angle of approximately 0° or 90°.

9. The optical isolator of claim 8 wherein said correction element has a crystal optic axis α which lies with the plane defined by said at least one o-ray and said at least one e-ray.

10. The optical isolator of claim 5, wherein said correction element has a length L and a crystal optic axis angle α which are selected such that said at least one e-ray is refracted by said correction element such that the respective light paths of said at least one e-ray and said at least one o-ray intersect at a location proximate to a face of said correction element.

11. The optical isolator of claim 10 wherein said at least one o-rays and said at least one e-rays are refracted by said correction element.

12. The optical isolator of claim 10 wherein said at least one o-ray and said at least one e-ray intersect at an angle β.

13. The optical isolator of claim 10 wherein said at least one o-ray and said at least one e-ray exit said second polarizer separated by a walk-off distance which is approximately equal to said length L of the correction element multiplied by the tangent of an angle β, said angle β defined by an intersection of said at least on e-ray and said at least one o-ray.

14. The optical isolator of claim 13 wherein said tangent of said angle β is defined as:

$$\tan(\beta) = \frac{(n_e^2 - n_o^2)\sin(\alpha)\cos(\alpha)}{n_o^2\sin^2\alpha + n_e^2\cos^2\alpha}.$$

15. The optical isolator of claim 5, wherein said first polarizer and said second polarizer, comprise birefringent material.

16. The optical isolator of claim 5, wherein said first polarizer, said polarization rotator, said second polarizer, and said correction element are arranged in a sequence along an axis of said isolator.

17. An optical isolator adapted for receiving light transmitted through the isolator in a forward direction comprising:
- a first polarizer, having a wedge shape and disposed along a path, configured to separate light incident in the forward direction into at least one o-ray and at least one e-ray;
- a polarization rotator disposed along the path;
- a second polarizer, having a wedge shape and disposed along the path after the polarization rotator, configured to refract the at least one o-ray and at least one e-ray such that they exit said second polarizer in substantially parallel light paths separated by a walk-off distance; and
- a correction element, disposed along the path and adjacent to a diagonal face of the second polarizer, having a length and a crystal optic axis which lies in a plane defined by the at least one o-ray and at least one e-ray, and wherein at least one of the at least one o-ray and at least one e-ray exiting the second polarizer are refracted by the correction element such that their respective light paths intersect at an angle β, and wherein the length and the crystal optic axis angle compensates for differential group delay and walk-off introduced by the first and the second polarizers wherein the correction element includes an optical plane in which said o-rays and said e-rays travel, and wherein said optical plane is perpendicular to an optic axis of said second polarizer, and an input face of the correction element being parallel to an input face of the second polarizer such that the optical plane of the correction element is perpendicular to the optic axis of the second polarizer.

18. The optical isolator of claim 17 wherein said correction element is configured to substantially eliminate said walk-off distance between said at least one o-ray and said at least one e-ray exiting said second polarizer.

19. The optical isolator of claim 17 wherein said correction element is configured to substantially eliminate said differential group delay.

20. The optical isolator of claim 17 wherein said first polarizer has a crystal optic axis angle of approximately +45° or −45° relative to a vertical edge of the first polarizer.

21. The optical isolator of claim 17 wherein said second polarizer has a crystal optic axis angle of approximately 0° or 90° relative to a vertical edge of the second polarizer.

22. The optical isolator of claim 17 wherein said polarization rotator comprises a 45° Faraday rotator.

23. The optical isolator of claim 17 wherein said correction element has a length L and a crystal optic axis cutting angle α which are selected such that said at least one o-ray or said at least one e-ray is refracted by said correction element such that their respective light paths intersect at a location proximate to a face of said correction element.

24. The optical isolator of claim 17 wherein said at least one o-ray and said at least one e-ray are refracted by said correction element.

25. The optical isolator of claim 17 wherein said at least one o-ray and said at least one e-ray exit said second polarizer separated by a walk-off distance which is approximately equal to said length L multiplied by the tangent of said angle β.

26. The optical isolator of claim 25 wherein said tangent of said angle β is defined as:

$$\tan(\beta) = \frac{(n_e^2 - n_o^2)\sin(\alpha)\cos(\alpha)}{n_o^2\sin^2\alpha + n_e^2\cos^2\alpha}.$$

27. The optical isolator of claim 17, wherein said first polarizer and said second polarizer comprise birefringent material.

28. The optical isolator of claim 17, wherein said first polarizer, said polarization rotator, said second polarizer, and said correction element are arranged in a sequence along an axis of said optical isolator.

29. A method for receiving light passing through an optical isolator in a forward direction through the isolator comprising
- providing a first polarizer, having a wedge shape and disposed along a path, configured to separate light incident in the forward direction into at least one o-ray and at least one e-ray;
- providing a polarization rotator disposed along the path;
- providing a second polarizer, having a wedge shape and disposed along the path after the polarization rotator, configured to refract the at least one o-ray and at least one e-ray such that they exit second polarizer in substantially parallel light paths separated by a walk-off distance; and
- providing a correction element, disposed along the path and adjacent to a diagonal face of the second polarizer,
- separating the light traveling in a forward direction into at least one o-ray and at least one e-ray;
- rotating the polarization of the at least one o-ray and the at least one e-ray; refracting the at least one o-ray and the at least one e-ray such that they are in substantially parallel paths;
- passing the at least one o-ray and the at least one e-ray through the correction elements having an optic axis in a plane defined by the substantially parallel paths and a length which compensates for differential group delay and which also substantially eliminates said walk-off distance introduced by the separating and refracting, wherein the correction element includes an optical plane in which said o-rays and said e-rays travel, wherein said optical plane is perpendicular to an optic axis of said second polarizer, and an input face of the correction element being parallel to an input face of the second polarizer such that the optical plane of the correction element is perpendicular to the optic axis of the second polarizer.

30. The method of claim 29, wherein said correction element is configured to substantially eliminate first order polarization mode dispersion.

31. The method of claim 30 wherein the first order polarization mode dispersion is a differential group delay.

32. The method of claim 29, wherein said correction element has a length L and a crystal optic axis cutting angle α which are selected such that said at least one o-ray and said at least one e-ray are refracted by said correction element such that said light paths intersect at a location proximate to a face of said correction element.

33. The method of claim 32 wherein said at least one o-ray and said at least one e-ray are separated by said walk off distance which is approximately equal to said length L multiplied by the tangent of an angle β.

34. The method of claim 33 wherein said tangent of said angle β is defined as:

$$\tan(\beta) = \frac{(n_e^2 - n_o^2)\sin(\alpha)\cos(\alpha)}{n_o^2\sin^2\alpha + n_e^2\cos^2\alpha}.$$

\* \* \* \* \*

UNITED STATES PATENT AND TRADEMARK OFFICE
CERTIFICATE OF CORRECTION

PATENT NO.         : 7,173,762 B2
APPLICATION NO. : 09/900713
DATED                 : February 6, 2007
INVENTOR(S)       : Haung et al.

It is certified that error appears in the above-identified patent and that said Letters Patent is hereby corrected as shown below:

Column 1
Line 39, change "o-and" to --o- and--
Line 45, change "e-and" to --e- and--
Line 48, before "lens" insert --first--
Line 48, change "104" to --106--

Column 3
Line 26, change "o-and" to --o- and--
Line 41, change "o-and" to --o- and--
Line 47, before "45°" insert --are--
Line 54, change "o-and" to --o- and--
Line 60, change "o-and" to --o- and--

Column 4
Line 55, before "isolator" change "a" to --an--

Column 5
Line 12, change "e-and" to --e- and--

Column 6
Line 13, change "rotator:" to --rotator;--
Line 30, change "o-and" to --o- and--
Line 66, before "e-ray" change "on" to --one--

Column 8
Line 28, change "comprising" to --comprising:--

UNITED STATES PATENT AND TRADEMARK OFFICE
CERTIFICATE OF CORRECTION

PATENT NO.      : 7,173,762 B2
APPLICATION NO. : 09/900713
DATED           : February 6, 2007
INVENTOR(S)     : Haung et al.

It is certified that error appears in the above-identified patent and that said Letters Patent is hereby corrected as shown below:

Column 9
Line 8, change "walk off" to --walk-off--

Signed and Sealed this

Eleventh Day of November, 2008

JON W. DUDAS
*Director of the United States Patent and Trademark Office*